United States Patent
Gu et al.

(10) Patent No.: US 11,772,078 B2
(45) Date of Patent: Oct. 3, 2023

(54) LAYERED CATALYST STRUCTURES AND METHODS OF MAKING THE SAME

(71) Applicants: GM GLOBAL TECHNOLOGY OPERATIONS LLC, Detroit, MI (US); University of Central Florida Research Foundation, Inc., Orlando, FL (US)

(72) Inventors: Yuntao Gu, Farmington Hills, MI (US); Wei Li, Troy, MI (US); Fudong Liu, Oviedo, FL (US)

(73) Assignees: GM GLOBAL TECHNOLOGY OPERATIONS LLC, Detroit, MI (US); UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 0 days.

(21) Appl. No.: 17/581,447

(22) Filed: Jan. 21, 2022

(65) Prior Publication Data
US 2023/0234035 A1    Jul. 27, 2023

(51) Int. Cl.
*B01J 21/04*    (2006.01)
*B01J 23/10*    (2006.01)
(Continued)

(52) U.S. Cl.
CPC ............ *B01J 23/44* (2013.01); *B01J 21/04* (2013.01); *B01J 23/10* (2013.01); *B01J 35/0006* (2013.01);
(Continued)

(58) Field of Classification Search
CPC ... B01J 23/10; B01J 23/44; B01J 23/63; B01J 35/0006; B01J 35/1014; B01J 35/1042; B01J 37/0215; B01J 37/08
(Continued)

(56) References Cited

U.S. PATENT DOCUMENTS 4,714,694 A * 12/1987 Wan .................... B01J 23/63
502/355
4,727,052 A * 2/1988 Wan .................... B01J 23/40
502/328
(Continued)

OTHER PUBLICATIONS

Khivantsev, Konstantin et al.; "Achieving Atomic Dispersion of Highly Loaded Transition Metals in Small-Pore Zeolite SSZ-13: Hight-Capacity and High-Efficiency Low-Temperature CO and Passive NOx Adsorbers"; Angewandte Chemie, International Edition 2018, 57; pp. 16672-16677.
(Continued)

*Primary Examiner* — Cam N. Nguyen
(74) *Attorney, Agent, or Firm* — Harness, Dickey & Pierce, P.L.C.

(57) ABSTRACT

A layered catalyst structure for purifying an exhaust gas stream includes a catalyst support and a palladium catalyst layer including an atomic dispersion of palladium ions electrostatically adsorbed onto an exterior surface of the catalyst support. The catalyst support includes an alumina substrate, a first ceria layer disposed on and extending substantially continuously over the alumina substrate, and a second colloidal ceria layer formed directly on the first ceria layer over the alumina substrate. The palladium catalyst layer is formed on the exterior surface of the catalyst support by applying a palladium-containing precursor solution to the exterior surface of the catalyst support and then heating the catalyst support and the palladium-containing precursor solution. The palladium-containing precursor solution includes a positively charged palladium complex in an aqueous medium and has a pH greater than a point of zero charge of the second colloidal ceria layer.

20 Claims, 2 Drawing Sheets

(51) Int. Cl.
  *B01J 23/44* (2006.01)
  *B01J 23/63* (2006.01)
  *B01J 35/00* (2006.01)
  *B01J 35/10* (2006.01)
  *B01J 37/02* (2006.01)
  *B01J 37/08* (2006.01)

(52) U.S. Cl.
  CPC ....... *B01J 35/1014* (2013.01); *B01J 35/1042* (2013.01); *B01J 37/0215* (2013.01); *B01J 37/08* (2013.01)

(58) Field of Classification Search
  USPC ................ 502/304, 334, 339, 355, 415, 439
  See application file for complete search history.

(56) References Cited

U.S. PATENT DOCUMENTS

| | | | | |
|---|---|---|---|---|
| 4,738,947 | A * | 4/1988 | Wan | B01J 37/04 423/213.5 |
| 6,492,297 | B1 * | 12/2002 | Sung | B01D 53/945 502/302 |
| 6,764,665 | B2 * | 7/2004 | Deeba | B01J 23/63 423/239.1 |
| 7,022,646 | B2 * | 4/2006 | Li | B01D 53/9422 502/339 |
| 8,080,494 | B2 * | 12/2011 | Yasuda | F01N 3/2803 502/328 |
| 8,545,780 | B1 * | 10/2013 | Chen | B01J 23/63 502/328 |
| 8,679,434 | B1 * | 3/2014 | Li | B01D 53/944 60/299 |
| 8,835,346 | B2 * | 9/2014 | Gramiccioni | B01J 37/0242 502/340 |
| 9,138,725 | B2 * | 9/2015 | Hoke | B01J 23/63 |
| 9,242,242 | B2 * | 1/2016 | Hilgendorff | B01J 37/0248 |
| 10,099,205 | B2 * | 10/2018 | Cabiac | B01J 35/006 |
| 10,493,434 | B2 * | 12/2019 | Grubert | F01N 3/0814 |
| 10,695,748 | B2 * | 6/2020 | Boualleg | B01J 21/04 |
| 10,946,370 | B2 * | 3/2021 | Petit-Clair | B01J 37/0211 |
| 11,071,966 | B2 | 7/2021 | Khivantsev et al. | |
| 2020/0061595 | A1 | 2/2020 | Khivantsev et al. | |
| 2021/0220812 | A1 | 7/2021 | Liu et al. | |

OTHER PUBLICATIONS

Yuntao Gu et al.; U.S. Appl. No. 17/749,894, filed May 20, 2022, entitled "Rhodium-Containing Layered Catalyst Structures and Methods of Making the Same"; 33 pages.

Gu, Yuntao et al.; U.S. Appl. No. 17/581,447, filed Jan. 21, 2022, entitled "Layered Catalyst Structures and Methods of Making the Same"; 34 pages.

Gu, Yuntao et al.; U.S. Appl. No. 17/725,828, filed Apr. 21, 2022, entitled "Three-Way Catalyst With Reduced Palladium Loading and Method of Making the Three-Way Catalyst"; 33 pages.

* cited by examiner

LAYERED CATALYST STRUCTURES AND METHODS OF MAKING THE SAME

GOVERNMENT FUNDING

This invention was made with Government support under Agreement No. DE-EE0009196 awarded by the U.S. Department of Energy. The Government may have certain rights in the invention.

INTRODUCTION

This section provides background information related to the present disclosure which is not necessarily prior art.

The present disclosure relates to catalysts for purifying exhaust gas streams from combustion processes and to methods of manufacturing layered catalyst structures including mixed metal oxide support materials loaded with palladium catalysts.

Exhaust gases from combustion processes typically contain a variety of combustion reaction by-products, including unburned hydrocarbons (HC), carbon monoxide (CO), nitric oxide (NO), and nitrogen dioxide ($NO_2$), with NO and $NO_2$ collectively referred to as nitrogen oxides or NOR. It may be desirable to reduce or control the emission of HC, CO, and/or NOR from various combustion processes into the ambient environment.

Exhaust gas treatment systems for internal combustion engines of automotive vehicles may include a so-called three-way catalyst (TWC) disposed in a path of an exhaust gas stream from the engine, which is designed to simultaneously convert HC, CO, and NOR in the exhaust gas stream to $CO_2$, $N_2$, and $H_2O$ prior to discharge. Such three-way catalysts oftentimes include one or more platinum group metal (PGM) elements (e.g., platinum, rhodium, palladium, et al.) supported on a thermally and mechanically stable, high surface area porous support material, which may comprise alumina ($Al_2O_3$).

SUMMARY

This section provides a general summary of the disclosure and is not a comprehensive disclosure of its full scope or all of its features.

A method of manufacturing a layered catalyst structure for purifying an exhaust gas stream is disclosed. In aspects, the method includes the following steps: (a) applying a palladium-containing precursor solution to an exterior surface of a catalyst support and (b) heating the catalyst support and the palladium-containing precursor solution to form an atomic dispersion of palladium ions on the exterior surface of the catalyst support. The catalyst support includes an alumina substrate, a first ceria layer disposed on and extending substantially continuously over the alumina substrate, and a second colloidal ceria layer deposited on the first ceria layer over the alumina substrate such that the exterior surface of the catalyst support is defined by the second colloidal ceria layer. The palladium-containing precursor solution comprises a positively charged palladium complex in an aqueous medium. The palladium-containing precursor solution has a pH greater than a point of zero charge of the second colloidal ceria layer. The catalyst support and the palladium-containing precursor solution are heated in step (b) to evaporate the aqueous medium, decompose the positively charged palladium complex, and form the atomic dispersion of palladium ions on the exterior surface of the catalyst support.

The aqueous medium may comprise an aqueous ammonium hydroxide solution.

The palladium-containing precursor solution may have a pH of greater than or equal to about 11 to less than or equal to about 12.

The positively charged palladium complex may comprise a tetraammine palladium(II) complex.

When the palladium-containing precursor solution is applied to the exterior surface of the catalyst support in step (a), a net negative charge may be imparted to the exterior surface of the catalyst support and the positively charged palladium complex may electrostatically adsorb onto the exterior surface of the catalyst support. In aspects, the positively charged palladium complex may electrostatically adsorb onto the exterior surface of the catalyst support at the location of a surface defect site in the second colloidal ceria layer.

The method may further comprise dissolving or dispersing a palladium salt in an aqueous ammonium hydroxide solution to form the palladium-containing precursor solution of step (a). In aspects, the palladium salt may comprise at least one of palladium nitrate, palladium tetraammine dinitrate, palladium tetraammine dichloride, palladium tetraammine acetate, palladium tetraammine sulfate, or a combination thereof.

The catalyst support may be impregnated with the palladium-containing precursor solution in step (a) using a wet impregnation technique or an incipient wetness impregnation technique.

The catalyst support and the palladium-containing precursor solution may be heated in step (b) at a temperature of greater than or equal to about 350 degrees Celsius to less than or equal to about 800 degrees Celsius.

Heating the catalyst support and the palladium-containing precursor solution in step (b) may release gases or vapors of nitrogen, nitrogen oxides, ammonia, and/or water.

Another method of manufacturing a layered catalyst structure for purifying an exhaust gas stream is disclosed. In aspects, the method may comprise the following steps in the sequence set forth: (a) applying a cerium-containing precursor solution to an exterior surface of an alumina substrate, (b) heating the alumina substrate and the cerium-containing precursor solution at a first temperature to form a first ceria layer on the exterior surface of the alumina substrate, the first ceria layer extending substantially continuously over the exterior surface of the alumina substrate, (c) applying a ceria-containing colloidal suspension to the alumina substrate over the first ceria layer, (d) heating the alumina substrate, the first ceria layer, and the ceria-containing colloidal suspension at a second temperature to deposit colloidal ceria particles directly on the first ceria layer and form a catalyst support including the alumina substrate, the first ceria layer, and a second colloidal ceria layer overlying the first ceria layer on the alumina substrate, (e) applying a palladium-containing precursor solution to an exterior surface of the catalyst support, the palladium-containing precursor solution comprising a positively charged palladium complex in an aqueous medium and having a pH greater than a point of zero charge of the second colloidal ceria layer, and (f) heating the catalyst support and the palladium-containing precursor solution at a third temperature to evaporate the aqueous medium, decompose the positively charged palladium complex, and form an atomic dispersion of palladium ions on the exterior surface of the catalyst support.

The cerium-containing precursor solution of step (a) may comprise a cerium salt in an aqueous medium. The alumina substrate and the cerium-containing aqueous precursor solution may be heated in step (b) in an oxygen-containing environment at a first temperature of greater than or equal to about 550 degrees Celsius to less than or equal to about 1050 degrees Celsius.

The ceria-containing colloidal suspension of step (c) may comprise a plurality of colloidal ceria particles in an aqueous medium. The colloidal ceria particles may have a D50 diameter of greater than or equal to about 5 nanometers to less than or equal to about 20 nanometers. The alumina substrate, the first ceria layer, and the ceria-containing colloidal suspension may be heated in step (d) in an oxygen-containing environment at a second temperature of greater than or equal to about 350 degrees Celsius to less than or equal to about 800 degrees Celsius.

In step (c), the aqueous medium may comprise an aqueous ammonium hydroxide solution, and the palladium-containing precursor solution may have a pH of greater than or equal to about 11 to less than or equal to about 12.

The positively charged palladium complex may comprise a tetraammine palladium(II) complex.

When the palladium-containing precursor solution is applied to the exterior surface of the catalyst support in step (e), a net negative charge may be imparted to the exterior surface of the catalyst support and the positively charged palladium complex may electrostatically adsorb onto the exterior surface of the catalyst support.

The catalyst support and the palladium-containing precursor solution may be heated in step (f) in an oxygen-containing environment at a third temperature of greater than or equal to about 350 degrees Celsius to less than or equal to about 800 degrees Celsius. Heating the catalyst support and the palladium-containing precursor solution in step (f) may release gases or vapors of nitrogen, nitrogen oxides, ammonia, and/or water.

A layered catalyst structure for purifying an exhaust gas stream is disclosed. The layered catalyst structure comprises a catalyst support and a palladium catalyst layer electrostatically adsorbed onto an exterior surface of the catalyst support. The catalyst support includes an alumina substrate, a first ceria layer disposed on and extending substantially continuously over the alumina substrate, and a second colloidal ceria layer formed directly on the first ceria layer over the alumina substrate. The palladium catalyst layer including an atomic dispersion of palladium ions electrostatically adsorbed onto the exterior surface of the catalyst support. The atomic dispersion of palladium ions may be electrostatically adsorbed onto the exterior surface of the catalyst support at the location of surface defect sites in the second colloidal ceria layer.

The first ceria layer may have a BET surface area of greater than or equal to about 30 $m^2/g$ to less than or equal to about 150 $m^2/g$ and a pore volume of greater than or equal to about 0.2 mL/g to less than or equal to about 1.5 mL/g.

The second colloidal ceria layer may have a BET surface area of greater than or equal to about 50 $m^2/g$ to less than or equal to about 180 $m^2/g$ and a pore volume of greater than or equal to about 0.2 mL/g to less than or equal to about 1.5 mL/g.

The BET surface area of the second colloidal ceria layer may be greater than that of the first ceria layer.

Together, the first ceria layer and the second colloidal ceria layer may constitute, by weight, greater than or equal to about 5% to less than or equal to about 40% of the layered catalyst structure.

The palladium catalyst layer may constitute, by weight, greater than or equal to about 0.1% to less than or equal to about 5% of the layered catalyst structure.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s), as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges and encompass minor deviations from the given values and embodiments, having about the value mentioned as well as those having exactly the value mentioned. Other than the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

As used herein, the terms "composition" and "material" are used interchangeably to refer broadly to a substance containing at least the preferred chemical constituents, elements, or compounds, but which may also comprise additional elements, compounds, or substances, including trace amounts of impurities, unless otherwise indicated.

Example embodiments will now be described more fully with reference to the accompanying drawings.

The present disclosure relates to palladium (Pd)-, ceria ($CeO_2$)-, and alumina ($Al_2O_3$)-containing layered catalyst structures for purifying exhaust gas streams from combustion processes and to methods of manufacturing the $Pd/CeO_2/Al_2O_3$ layered catalyst structures. The layered catalyst structures comprise a catalyst support that includes an $Al_2O_3$ substrate, a first $CeO_2$ layer deposited on the $Al_2O_3$ substrate, and a second colloidal $CeO_2$ layer including a plurality of colloidal $CeO_2$ particles deposited on the $Al_2O_3$ substrate over the first $CeO_2$ layer. An atomic dispersion of palladium (Pd) is formed as a catalyst layer on exposed surfaces of the high surface area colloidal $CeO_2$ particles using a strong electrostatic adsorption technique, which allows for a relatively high loading of Pd atoms on the catalyst support. In addition, the strong electrostatic adsorption technique promotes the deposition of discrete Pd atoms on the catalyst support and inhibits the formation and/or agglomeration of relatively large Pd particles on the catalyst support, which may help maximize the number of active Pd catalyst sites on the catalyst support without increasing the Pd loading.

In practice, the disclosed $Pd/CeO_2/Al_2O_3$ layered catalyst structures may help catalyze the conversion of unburned hydrocarbons (HC), carbon monoxide (CO), nitric oxide (NO), and nitrogen dioxide ($NO_2$) in exhaust gas streams from combustion processes to carbon dioxide ($CO_2$), nitrogen ($N_2$), and water ($H_2O$) prior to discharging the exhaust gas streams to the ambient environment.

Figure 1:
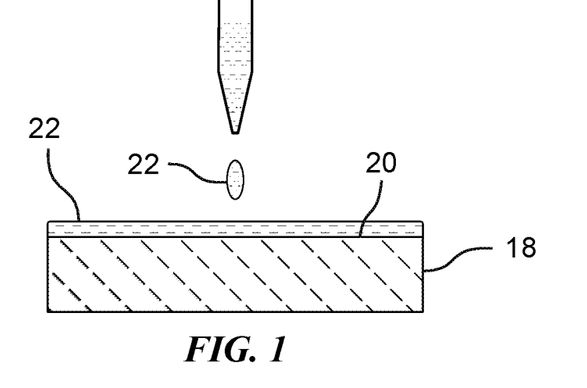
FIG. 1 is a schematic depiction of a step in a method of manufacturing a layered catalyst structure, wherein an $Al_2O_3$ substrate is impregnated with a Ce-containing precursor solution.

Referring now to FIG. 1, a method of manufacturing a layered catalyst structure 10 (FIG. 7) may include a first stage in which a catalyst support 12 (FIG. 4) is prepared and a second stage in which a palladium (Pd) catalyst layer 14 (FIG. 7) is deposited on surfaces 16 of the catalyst support 12 to form the layered catalyst structure 10. In the first stage, an alumina ($Al_2O_3$) substrate 18 defining an exterior surface 20 may be provided. The $Al_2O_3$ substrate 18 is porous and provides the layered catalyst structure 10 with exceptional thermal and mechanical stability. The $Al_2O_3$ substrate 18 may comprise an $Al_2O_3$ powder including a plurality of $Al_2O_3$ particles having a D50 particle diameter of greater than or equal to about 20 micrometers to less than or equal to about 70 micrometers. For example, the plurality of $Al_2O_3$ particles in the $Al_2O_3$ powder may have a D50 particle diameter of greater than or equal to about 40 micrometers to less than or equal to about 60 micrometers, or of about 50 micrometers. The $Al_2O_3$ substrate 18 may have a BET surface area of about 80 $m^2/g$ and a pore volume of about 0.6 mL/g.

As shown in FIG. 1, the $Al_2O_3$ substrate 18 may be impregnated with a cerium (Ce)-containing precursor solution 22 by applying the Ce-containing precursor solution 22 directly to the exterior surface 20 of the $Al_2O_3$ substrate 18. The Ce-containing precursor solution 22 may comprise a cerium salt dissolved or dispersed in an aqueous medium. The cerium salt may comprise a cation of cerium ($Ce^{3+}$) and a counterion (anion) of a nitrate ($NO_3^-$), sulphate ($SO_4^{2-}$), carbonate ($CO_3^{2-}$), citrate, halide (e.g., $F^-$ or $Cl^-$), alkoxide, phenoxide, acetates, benzoate, oxalate, acetylacetonate, and/or carboxylate. The aqueous medium may comprise water ($H_2O$). The amount of cerium in the Ce-containing precursor solution 22 may be selected to achieve a target cerium loading on the $Al_2O_3$ substrate 18. In aspects, the amount of cerium in the Ce-containing precursor solution 22 may constitute, by weight, greater than or equal to about 5% to less than or equal to about 30% of the Ce-containing precursor solution 22. For example, the Ce-containing precursor solution 22 may comprise cerium in an amount constituting, by weight, about 10% of the Ce-containing precursor solution 22. The $Al_2O_3$ substrate 18 may be impregnated with the Ce-containing precursor solution 22 using a dry or incipient wetness impregnation technique, wherein a volume of the Ce-containing precursor solution 22 applied to the $Al_2O_3$ substrate 18 is substantially equal to a calculated pore volume of the $Al_2O_3$ substrate 18.

Figure 2:
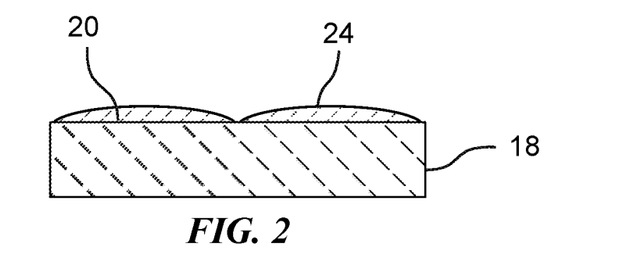
FIG. 2 is a schematic depiction of the $Al_2O_3$ substrate of FIG. 1 after the $Al_2O_3$ substrate and the Ce-containing precursor solution have been subjected to a first heat treatment to form a first $CeO_2$ layer on a surface of the $Al_2O_3$ substrate.

Referring now to FIG. 2, after the Ce-containing precursor solution 22 is applied to the exterior surface 20 of the $Al_2O_3$ substrate 18, the $Al_2O_3$ substrate 18 and the Ce-containing precursor solution 22 are subjected to a first heat treatment to remove the aqueous medium and the anion of the cerium salt (e.g., by evaporation), and to deposit a first $CeO_2$ layer 24 on the exterior surface 20 of the $Al_2O_3$ substrate 18. The first heat treatment may comprise heating the $Al_2O_3$ substrate 18 and the Ce-containing precursor solution 22 in an oxygen ($O_2$)-containing environment (e.g., air) at a temperature of greater than or equal to about 550° C. to less than or equal to about 1050° C. for a duration of greater than or equal to about one (1) hour to less than or equal to about 5 hours to form the first $CeO_2$ layer 24 on the exterior surface 20 of the $Al_2O_3$ substrate 18. In aspects, the first heat treatment may comprise heating the $Al_2O_3$ substrate 18 and the Ce-containing precursor solution 22 in an $O_2$-containing environment at a temperature of about 800° C. for a duration of about 2 hours to form the first $CeO_2$ layer 24 on the exterior surface 20 of the $Al_2O_3$ substrate 18.

The first $CeO_2$ layer 24 is porous and extends substantially continuously over the exterior surface 20 of the $Al_2O_3$ substrate 18. The first $CeO_2$ layer 24 may have a BET surface area of greater than or equal to about 30 $m^2/g$ to less than or equal to about 150 $m^2/g$ and a pore volume of greater than or equal to about 0.2 mL/g to less than or equal to about 1.5 mL/g. In aspects, the impregnation and heat treatment steps may be repeated to achieve a target $CeO_2$ loading on the $Al_2O_3$ substrate 18.

Figure 3:
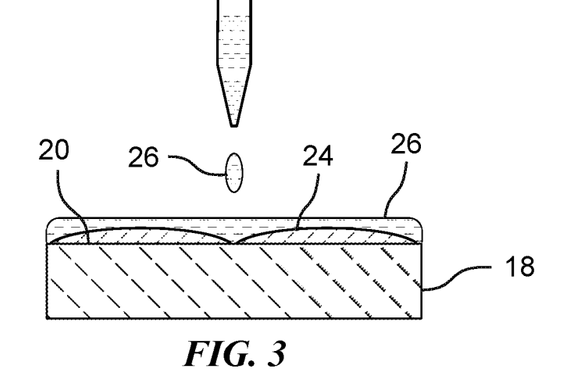
FIG. 3 is a schematic depiction of the $Al_2O_3$ substrate and the first $CeO_2$ layer of FIG. 2, wherein the first $CeO_2$ layer is impregnated with a Ce-containing colloidal suspension.

Referring now to FIG. 3, after formation of the first $CeO_2$ layer 24, the first $CeO_2$ layer 24 is impregnated with a cerium (Ce)-containing colloidal suspension 26, for example, by applying the Ce-containing colloidal suspension 26 directly onto the first $CeO_2$ layer 24, over the exterior surface 20 of the $Al_2O_3$ substrate 18. The Ce-containing colloidal suspension 26 may comprise a plurality of colloidal $CeO_2$ particles suspended in an aqueous medium. The colloidal $CeO_2$ particles may consist essentially of $CeO_2$ and have a D50 diameter of greater than or equal to about 5 nanometers to less than or equal to about 20 nanometers, or greater than or equal to about 10 nanometers to less than or equal to about 15 nanometers. The aqueous medium may comprise water ($H_2O$) and optionally an acid, e.g., acetic acid, which may help the colloidal $CeO_2$ particles remain suspended in the aqueous medium of the Ce-containing colloidal suspension 26. The amount of colloidal $CeO_2$ particles in the Ce-containing colloidal suspension 26 may be selected to achieve a target colloidal $CeO_2$ particle loading. In aspects, the colloidal $CeO_2$ particles may constitute, by weight, greater than or equal to about 10% to less than or equal to about 30% of the Ce-containing colloidal suspension 26. In aspects, the first $CeO_2$ layer 24 may be impregnated with the Ce-containing colloidal suspension 26 using a dry or incipient wetness impregnation technique, wherein the volume of the Ce-containing colloidal suspension 26 applied to the first $CeO_2$ layer 24 is substantially equal to a calculated pore volume of the first $CeO_2$ layer 24.

Figure 4:
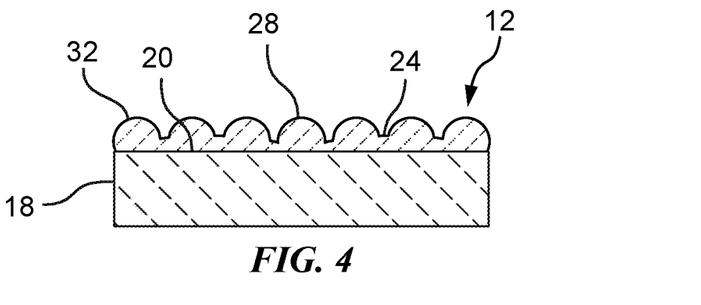
FIG. 4 is a schematic depiction of a catalyst support including the $Al_2O_3$ substrate and the first $CeO_2$ layer of FIG. 3, and a second colloidal $CeO_2$ layer formed on the $Al_2O_3$ substrate over the first $CeO_2$ layer by subjecting the $Al_2O_3$ substrate, the first $CeO_2$ layer, and the Ce-containing colloidal suspension of FIG. 3 to a second heat treatment.

Referring now to FIG. 4, the $Al_2O_3$ substrate 18, the first $CeO_2$ layer 24, and the Ce-containing colloidal suspension 26 are subjected to a second heat treatment to form a second colloidal $CeO_2$ layer 28 directly on the first $CeO_2$ layer 24. Together, the $Al_2O_3$ substrate 18, the first $CeO_2$ layer 24, and the second colloidal $CeO_2$ layer 28 make-up the catalyst support 12, with the second colloidal $CeO_2$ layer 28 defining an exterior surface 32 of the catalyst support 12. During the second heat treatment, the $Al_2O_3$ substrate 18, the first $CeO_2$ layer 24, and the Ce-containing colloidal suspension 26 are heated to remove the aqueous medium (e.g., by evaporation) and deposit the second colloidal $CeO_2$ layer 28 directly on the first $CeO_2$ layer 24 over the $Al_2O_3$ substrate 18. The second heat treatment may include heating the $Al_2O_3$ substrate 18, the first $CeO_2$ layer 24, and the Ce-containing colloidal suspension 26 in an oxygen $O_2$-containing environment (e.g., air) at a temperature of greater than or equal to about 350° C. to less than or equal to about 800° C. for a duration of greater than or equal to about one (1) hour to less than or equal to about 5 hours. In aspects, the second heat treatment may comprise heating the $Al_2O_3$ substrate 18, the first $CeO_2$ layer 24, and the Ce-containing colloidal suspension 26 in an $O_2$-containing environment at a temperature of about 550° C. for a duration of about 2 hours to form the second colloidal $CeO_2$ layer 28 on the $Al_2O_3$ substrate 18.

The second colloidal $CeO_2$ layer 28 is porous and may be chemically and mechanically bonded to the first $CeO_2$ layer 24, for example, via lattice matching. The second colloidal $CeO_2$ layer 28 may consist essentially of $CeO_2$ and may have a BET surface area in a range of from about 50 m²/g to about 180 m²/g and a pore volume in a range of from about 0.2 mL/g to about 1.5 mL/g. In aspects, the impregnation and heat treatment steps may be repeated one or more times to achieve a target colloidal $CeO_2$ particle loading on the $Al_2O_3$ substrate 18.

The first $CeO_2$ layer 24 may help the second colloidal $CeO_2$ layer 28 adhere to the surface 20 of the $Al_2O_3$ substrate 18 and may extend substantially continuously over the surface 20 of the $Al_2O_3$ substrate 18. The second colloidal $CeO_2$ layer 28 may be formed on the $Al_2O_3$ substrate 18 over the first $CeO_2$ layer 24 and may provide the catalyst support 12 with a relatively high number of surface defects sites. Defects sites on the exterior surface 32 of the catalyst support 12 may occur, for example, at the locations of oxygen vacancies, interstitial atoms, lattice substitutions, dislocations, grain boundaries, or impurities in the second colloidal $CeO_2$ layer 28. Without intending to be bound by theory, it is believed that the relatively high surface area and high pore volume of the second colloidal $CeO_2$ layer 28, as compared to that of the first $CeO_2$ layer 24, may provide the second colloidal $CeO_2$ layer 28 with a relatively high surface defect density, as compared to that of the first $CeO_2$ layer 24. In addition, it is believed that the most chemically reactive sites on the surface of a metal oxide occur at the location of surface defect sites. Therefore, formation of the second colloidal $CeO_2$ layer 28 on the $Al_2O_3$ substrate 18 over the first $CeO_2$ layer 24 may increase the surface defect density of the catalyst support 12 and may provide the layered catalyst structure 10 with improved catalytic activity.

Figure 5:
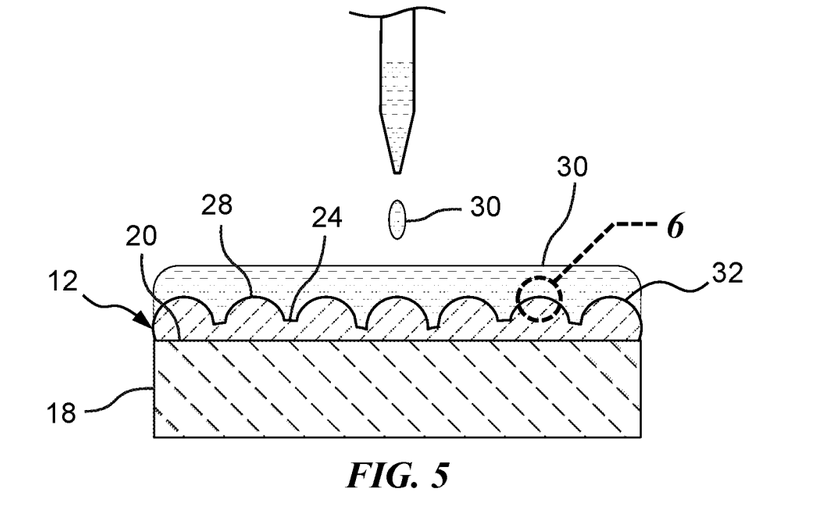
FIG. 5 is a schematic depiction of the catalyst support of FIG. 4, wherein the second colloidal $CeO_2$ layer of the catalyst support is impregnated with a Pd-containing precursor solution.

Referring now to FIG. 5, after formation of the second colloidal $CeO_2$ layer 28, a palladium (Pd)-containing precursor solution 30 is applied to the exterior surface 32 of the catalyst support 12 such that the Pd-containing precursor solution 30 at least partially impregnates the catalyst support 12 by infiltrating the pores thereof. As shown in FIG. 5, the Pd-containing precursor solution 30 may be applied directly to the surface 32 of the catalyst support 12 such that the Pd-containing precursor solution 30 wets the surfaces of the second colloidal $CeO_2$ layer 28 and infiltrates the pores thereof. The Pd-containing precursor solution 30 may comprise a palladium salt dissolved or dispersed in an aqueous medium. The palladium salt may comprise palladium(II) nitrate, $Pd(NO_3)_2$; palladium(II) tetraammine dinitrate, $[Pd(NH_3)_4](NO_3)_2$; palladium(II) tetraammine dichloride, $[Pd(NH_3)_4](Cl)_2$; palladium(II) tetraammine acetate, $[Pd(NH_3)_4](CH_3COO)_2$; and/or palladium(II) tetraammine sulfate, $[Pd(NH_3)_4]SO_4$. The aqueous medium may comprise an aqueous ammonium hydroxide ($NH_4OH$) solution, including ammonium hydroxide compounds dissolved or dispersed in water ($H_2O$). The amount of palladium in the Pd-containing precursor solution 30 may be selected to provide the layered catalyst structure 10 with a target Pd loading. The Pd-containing precursor solution 30 may be prepared by dissolving or dispersing the palladium salt in an aqueous $NH_4OH$ solution. In aspects, the palladium salt may be provided in the form of a hydrate complex, e.g., palladium(II) nitrate dihydrate ($Pd(NO_3)_2 \cdot 2H_2O$). The aqueous $NH_4OH$ solution may comprise, by weight, 56.6% $NH_4OH$ and the balance water (equivalent to 28 wt. % $NH_3$ in $H_2O$). Without intending to be bound by theory, it is believed that dissolution of the palladium salt in the aqueous $NH_4OH$ solution may result in the formation of positively charged $[Pd(NH_3)_4]^{2+}$ complexes balanced by anions of $NO_3^-$, $Cl^-$, $CH_3COO^-$, and/or $SO_4^{2-}$ in the Pd-containing precursor solution 30.

Figure 6:
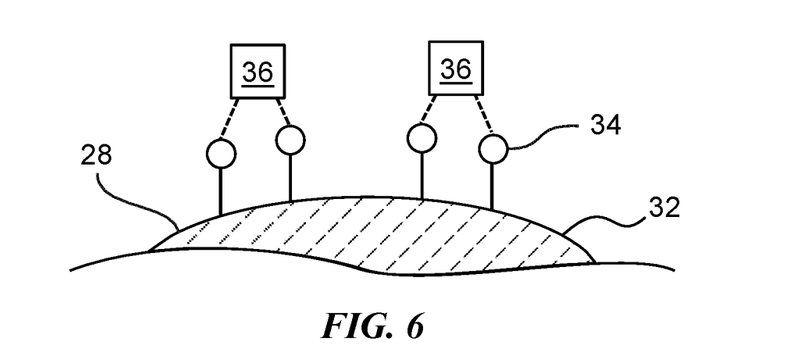
FIG. 6 is an enlarged view of a surface of the second colloidal $CeO_2$ layer of FIG. 5 depicting electrostatic interactions between negatively charged —$O^-$ groups (shown as circles, ○) on the surface of the second colloidal $CeO_2$ layer and positively charged $[Pd(NH_3)_4]^{2+}$ complexes (shown as squares, □) in the Pd-containing precursor solution during impregnation.

The Pd-containing precursor solution 30 is formulated to promote the adsorption of isolated $Pd^{2+}$ ions on the exterior surface 32 of the catalyst support 12 using a strong electrostatic adsorption technique. More specifically, the Pd-containing precursor solution 30 is formulated to promote strong electrostatic interactions between the $[Pd(NH_3)_4]^{2+}$ complexes in the Pd-containing precursor solution 30 and the exterior surface 32 of the catalyst support 12. To accomplish this, the pH of the Pd-containing precursor solution 30 is controlled or adjusted so that the pH of the Pd-containing precursor solution 30 is greater than a point of zero charge (PZC) of the second colloidal $CeO_2$ layer 28 of the catalyst support 12. As such, as shown in FIG. 6, when the Pd-containing precursor solution 30 is applied to the surface 32 of the catalyst support 12, functional groups on the surface of the second colloidal $CeO_2$ layer 28 will be deprotonated and converted to negatively charged species 34 (shown as circles, ○), creating a net negative charge on the surface 32 of the catalyst support 12. In aspects, the functional groups on the surface 32 of the catalyst support 12 may comprise hydroxyl groups (—OH), and the hydroxyl functional groups may be deprotonated and converted to negatively charged —O⁻ species on the surface 32 of the catalyst support 12. Without intending to be bound by theory, it is believed that the positively charged $[Pd(NH_3)_4]^{2+}$ complexes 36 (shown as squares, □) in the Pd-containing precursor solution 30 will be coulombically attracted to the negatively charged species 34 on the surface of the second colloidal $CeO_2$ layer 28 and will electrostatically adsorb onto the surface 32 of the catalyst support 12 at the locations of the negatively charged 34. Without intending to be bound by theory, it is believed that deprotonation of the functional groups and formation of the negatively charged species 34 may be favored at the location of surface defect sites in the second colloidal $CeO_2$ layer 28.

In aspects, the PZC of the second colloidal $CeO_2$ layer 28 of the catalyst support 12 may be in a range of from about 6.7 to about 8.6 at a temperature of about 25° C. Therefore, to promote strong electrostatic interactions between the $[Pd(NH_3)_4]^{2+}$ complexes in the Pd-containing precursor solution 30 and the surface 32 of the catalyst support 12, the pH of the Pd-containing precursor solution 30 may be controlled or adjusted so that the Pd-containing precursor solution 30 has a pH of greater than or equal to about 11 to less than or equal to about 12 at a temperature of about 25° C.

In aspects, the catalyst support 12 may be impregnated with the Pd-containing precursor solution 30 using a wet impregnation technique or a dry or incipient wetness impregnation technique. If a wet impregnation technique is used, the volume of the Pd-containing precursor solution 30 applied to the surface 32 of the catalyst support 12 will be greater than a calculated pore volume of the catalyst support 12. If a dry or incipient wetness impregnation technique is used, the volume of the Pd-containing precursor solution 30 applied to the surface 32 of the catalyst support 12 will be substantially equal to a calculated pore volume of the catalyst support 12.

Figure 7:
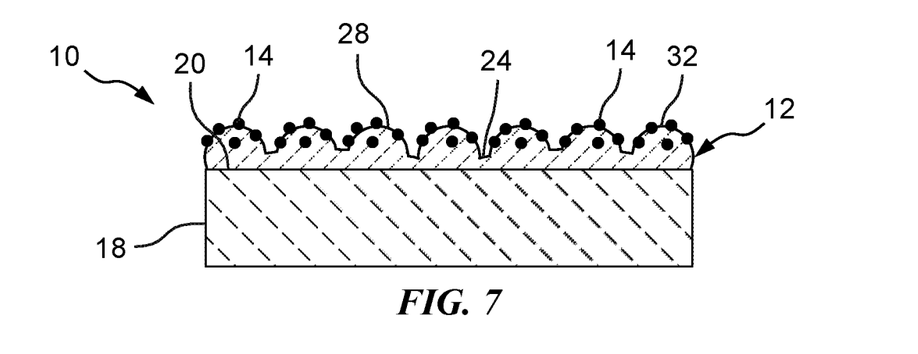
FIG. 7 is a schematic depiction of a layered catalyst structure including the catalyst support of FIG. 5, and a Pd catalyst layer formed directly on the surface of the second colloidal $CeO_2$ layer of the catalyst support by subjecting the catalyst support and the Pd-containing precursor solution of FIG. 5 to a third heat treatment.

Referring now to FIG. 7, the catalyst support 12 and the Pd-containing precursor solution 30 are subjected to a third heat treatment to deposit the Pd catalyst layer 14 directly on the surface 32 of the catalyst support 12 (i.e., directly on the surface of the second colloidal $CeO_2$ layer 28) and form the layered catalyst structure 10. During the third heat treatment, the catalyst support 12 and the Pd-containing precursor solution 30 may be heated to remove the aqueous medium and the anion of the palladium salt, to decompose the $[Pd(NH_3)_4]^{2+}$ complexes 36, to remove reaction byproducts from the catalyst support 12 (e.g., by evaporation), and deposit the Pd catalyst layer 14 directly on the surface 32 of the catalyst support 12. Chemical compounds that may be released in gas or vapor form from the catalyst support 12 and the Pd-containing precursor solution 30 during the third heat treatment may include nitrogen ($N_2$), nitrogen oxides (e.g., $N_2O$, $NO_2$, and/or NO), ammonia ($NH_3$), and/or $H_2O$.

The third heat treatment may include heating the catalyst support 12 and the Pd-containing precursor solution 30 in an oxygen $O_2$-containing environment (e.g., air) at a temperature of greater than or equal to about 350° C. to less than or equal to about 800° C. for a duration of greater than or equal to about one (1) hour to less than or equal to about 5 hours. In aspects, the third heat treatment may comprise heating the catalyst support 12 and the Pd-containing precursor solution 30 in an $O_2$-containing environment at a temperature of about 500° C. for a duration of about 2 hours to form the Pd catalyst layer 14 directly on the surface 32 of the catalyst support 12.

The Pd catalyst layer 14 may comprise an atomic dispersion of Pd' ions and optionally a plurality of sub-nanometer sized Pd particles deposited directly on the surface 32 of the catalyst support 12 (i.e., on the surface of the second colloidal $CeO_2$ layer 28). Without intending to be bound by theory, it is believed that coulombic forces between the $[Pd(NH_3)_4]^{2+}$ complexes 36 in the Pd-containing precursor solution 30 and the negatively charged species 34 on the catalyst support 12 may help anchor the $[Pd(NH_3)_4]^{2+}$ complexes 36 to the surface 32 of the catalyst support 12 at the specific locations of the negatively charged species 34, e.g., at the specific location of surface defect sites in the second colloidal $CeO_2$ layer 28. And, during the third heat treatment, these strong electrostatic interactions may inhibit migration of the $[Pd(NH_3)_4]^{2+}$ complexes 36 on the surface 32 of the catalyst support 12, which may, in turn, promote the deposition of isolated $Pd^{2+}$ ions on the catalyst support 12, instead of the formation and/or agglomeration of relatively large Pd and/or PdO particles. In aspects, when present, sub-nanometer sized Pd particles in the Pd catalyst layer 14 may have a D50 particle diameter of less than or equal to about one (1) nanometer.

The Pd catalyst layer 14 may consist essentially of palladium and may constitute, by weight, greater than or equal to about 0.1% to less than or equal to about 5.0% of the layered catalyst structure 10. For example, the Pd catalyst layer 14 may constitute, by weight, greater than or equal to about 0.8% to less than or equal to about 3.5% of the layered catalyst structure 10.

The second colloidal $CeO_2$ layer 28 and the first $CeO_2$ layer 24 may consist essentially of $CeO_2$ and, together, the second colloidal $CeO_2$ layer 28 and the first $CeO_2$ layer 24 may constitute, by weight, greater than or equal to about 5% to less than or equal to about 40% of the layered catalyst structure 10. For example, the second colloidal $CeO_2$ layer 28 and the first $CeO_2$ layer 24 may constitute, by weight, about 30% of the layered catalyst structure 10.

The layered catalyst structure 10 may be a substantially spherical particle having a diameter of greater than or equal to 200 micrometers to less than or equal to 500 micrometers. A plurality of the layered catalyst structures 10 may be positioned in a path of an exhaust gas stream from a combustion process to help catalyze the conversion of unburned hydrocarbons (HC), carbon monoxide (CO), nitric oxide (NO), and nitrogen dioxide ($NO_2$) in the exhaust gas stream to carbon dioxide ($CO_2$), nitrogen ($N_2$), and water ($H_2O$). A plurality of the layered catalyst structures 10 may be positioned in the path of an exhaust gas stream, for example, by filling a tube or passageway with a packed volume of the layered catalyst structures 10 or by depositing the layered catalyst structures 10 in the form of a slurry on wall surfaces of a flow-through monolithic substrate. Prior to positioning a plurality of the layered catalyst structures 10 in the path of an exhaust gas stream, the layered catalyst structures 10 may be sieved so that, in practice, the layered catalyst structures 10 exhibit a D50 particle diameter in a range of from about 245 micrometers to about 450 micrometers.

The HC, CO, and NO conversion efficiency of the layered catalyst structure 10 may be evaluated by exposing a volume of the layered catalyst structures 10 to a simulated exhaust gas stream including CO, NO, $C_3H_6$, and $C_3H_8$. The simulated exhaust gas flow may be heated from an initial temperature of 100° C. to a temperature of 450° C. to determine the HC, CO, and NO conversion efficiency of the layered catalyst structure 10 over a range of temperatures. The term "T50" refers to the temperature at which the layered catalyst structure 10 achieved 50% conversion efficiency. The layered catalyst structure 10 may have a T50 for CO oxidation of about 220° C., a T50 for NO reduction of about 273° C., a T50 for $C_3H_6$ oxidation of about 270° C., and a T50 for $C_3H_8$ oxidation of about 390° C.

The formation of isolated Pd' ions on the surface of the second colloidal $CeO_2$ layer 28 of the layered catalyst structure 10 may be confirmed and/or substantiated using diffuse reflectance infrared Fourier transform spectroscopy (DRIFTS). A DRIFTS spectra of CO adsorption collected over a volume of the layered catalyst structures 10 exposed to a feed of 1000 ppm CO at 25° C. may depict prominent bands at 2141 cm' and 2097 cm', and a DRIFTS spectra of NO adsorption collected over a volume of the layered catalyst structures 10 exposed to a feed of 1000 ppm NO at 25° C. may depict a prominent band at 1836 cm'. The presence of these bands is indicative of carbonyls and nitrosyls adsorbed on isolated $Pd^{2+}$ ions on the surface of the second colloidal $CeO_2$ layer 28 of the layered catalyst structure 10.

The foregoing description of the embodiments has been provided for purposes of illustration and description. It is not intended to be exhaustive or to limit the disclosure. Individual elements or features of a particular embodiment are generally not limited to that embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method of manufacturing a layered catalyst structure for purifying an exhaust gas stream, the method comprising:
   (a) applying a palladium-containing precursor solution to an exterior surface of a catalyst support, the catalyst support including an alumina substrate, a first ceria layer disposed on and extending continuously over the alumina substrate, and a second colloidal ceria layer deposited on the first ceria layer over the alumina substrate such that the exterior surface of the catalyst support is defined by the second colloidal ceria layer, wherein the palladium-containing precursor solution comprises a positively charged palladium complex in an aqueous medium and having a pH greater than a point of zero charge of the second colloidal ceria layer; and (b) heating the catalyst support and the palladium-containing precursor solution to evaporate the aqueous medium, decompose the positively charged palladium complex, and form an atomic dispersion of palladium ions on the exterior surface of the catalyst support.

2. The method of claim 1, wherein the aqueous medium comprises an aqueous ammonium hydroxide solution.

3. The method of claim 1, wherein the palladium-containing precursor solution has a pH of greater than or equal to about 11 to less than or equal to about 12.

4. The method of claim 1, wherein the positively charged palladium complex comprises a tetraammine palladium(II) complex.

5. The method of claim 1, wherein, when the palladium-containing precursor solution is applied to the exterior surface of the catalyst support in step (a), a net negative charge is imparted to the exterior surface of the catalyst support and the positively charged palladium complex electrostatically adsorbs onto the exterior surface of the catalyst support.

6. The method of claim 5, wherein the positively charged palladium complex electrostatically adsorbs onto the exterior surface of the catalyst support at the location of a surface defect site in the second colloidal ceria layer.

7. The method of claim 1, further comprising:
dissolving or dispersing a palladium salt in an aqueous ammonium hydroxide solution to form the palladium-containing precursor solution of step (a),
wherein the palladium salt comprises at least one of palladium nitrate, palladium tetraammine dinitrate, palladium tetraammine dichloride, palladium tetraammine acetate, palladium tetraammine sulfate, or a combination thereof.

8. The method of claim 1, wherein the catalyst support is impregnated with the palladium-containing precursor solution in step (a) using a wet impregnation technique or an incipient wetness impregnation technique.

9. The method cell of claim 1, wherein the catalyst support and the palladium-containing precursor solution are heated in step (b) at a temperature of greater than or equal to about 350 degrees Celsius to less than or equal to about 800 degrees Celsius.

10. The method cell of claim 1, wherein heating the catalyst support and the palladium-containing precursor solution in step (b) releases gases or vapors of nitrogen, nitrogen oxides, ammonia, and/or water.

11. A method of manufacturing a layered catalyst structure for purifying an exhaust gas stream, the method comprising the following in the sequence:

(a) applying a cerium-containing precursor solution to an exterior surface of an alumina substrate;

(b) heating the alumina substrate and the cerium-containing precursor solution at a first temperature to form a first ceria layer on the exterior surface of the alumina substrate, the first ceria layer extending continuously over the exterior surface of the alumina substrate;

(c) applying a ceria-containing colloidal suspension to the alumina substrate over the first ceria layer;

(d) heating the alumina substrate, the first ceria layer, and the ceria-containing colloidal suspension at a second temperature to deposit colloidal ceria particles directly on the first ceria layer and form a catalyst support including the alumina substrate, the first ceria layer, and a second colloidal ceria layer overlying the first ceria layer on the alumina substrate;

(e) applying a palladium-containing precursor solution to an exterior surface of the catalyst support, the palladium-containing precursor solution comprising a positively charged palladium complex in an aqueous medium and having a pH greater than a point of zero charge of the second colloidal ceria layer; and (f) heating the catalyst support and the palladium-containing precursor solution at a third temperature to evaporate the aqueous medium, decompose the positively charged palladium complex, and form an atomic dispersion of palladium ions on the exterior surface of the catalyst support.

12. The method of claim 11, wherein the cerium-containing precursor solution of step (a) comprises a cerium salt in an aqueous medium, and wherein the alumina substrate and the cerium-containing aqueous precursor solution are heated in step (b) in an oxygen-containing environment at a first temperature of greater than or equal to about 550 degrees Celsius to less than or equal to about 1050 degrees Celsius.

13. The method of claim 11, wherein the ceria-containing colloidal suspension of step (c) comprises a plurality of colloidal ceria particles suspended in an aqueous medium, wherein the colloidal ceria particles have a D50 diameter of greater than or equal to about 5 nanometers to less than or equal to about 20 nanometers, and wherein the alumina substrate, the first ceria layer, and the ceria-containing colloidal suspension are heated in step (d) in an oxygen-containing environment at a second temperature of greater than or equal to about 350 degrees Celsius to less than or equal to about 800 degrees Celsius.

14. The method of claim 11, wherein, in step (c), the aqueous medium comprises an aqueous ammonium hydroxide solution, and wherein the palladium-containing precursor solution has a pH of greater than or equal to about 11 to less than or equal to about 12.

15. The method of claim 11, wherein the positively charged palladium complex comprises a tetraammine palladium(II) complex.

16. The method of claim 11, wherein, when the palladium-containing precursor solution is applied to the exterior surface of the catalyst support in step (e), a net negative charge is imparted to the exterior surface of the catalyst support and the positively charged palladium complex electrostatically adsorbs onto the exterior surface of the catalyst support.

17. The method of claim 11, wherein the catalyst support and the palladium-containing precursor solution are heated in step (f) in an oxygen-containing environment at a third temperature of greater than or equal to about 350 degrees Celsius to less than or equal to about 800 degrees Celsius, and wherein heating the catalyst support and the palladium-containing precursor solution in step (f) releases gases or vapors of nitrogen, nitrogen oxides, ammonia, and/or water.

18. A layered catalyst structure for purifying an exhaust gas stream, the layered catalyst structure comprising:
a catalyst support including an alumina substrate, a first ceria layer disposed on and extending continuously over the alumina substrate, and a second colloidal ceria layer formed directly on the first ceria layer over the alumina substrate; and a palladium catalyst layer including an atomic dispersion of palladium ions electrostatically adsorbed onto an exterior surface of the catalyst support at the location of surface defect sites in the second colloidal ceria layer, wherein the palladium catalyst layer is manufactured by (a) applying a palladium-containing precursor solution to the exterior surface of the catalyst support defined by the second colloidal ceria layer, wherein the palladium-containing precursor solution comprises a positively charged palladium complex in an aqueous medium and having a pH greater than a point of zero charge of the second colloidal ceria layer, and (b) heating the catalyst support and the palladium-containing precursor solution to evaporate the aqueous medium, decompose the positively charged palladium complex, and form the atomic dispersion of palladium ions on the exterior surface of the catalyst support.

19. The layered catalyst structure of claim 18, wherein the first ceria layer has a BET surface area of greater than or equal to about 30 $m^2/g$ to less than or equal to about 150 $m^2/g$ and a pore volume of greater than or equal to about 0.2 mL/g to less than or equal to about 1.5 mL/g, wherein the second colloidal ceria layer has a BET surface area of greater than or equal to about 50 $m^2/g$ to less than or equal to about 180 $m^2/g$ and a pore volume of greater than or equal to about 0.2 mL/g to less than or equal to about 1.5 mL/g, and wherein the BET surface area of the second colloidal ceria layer is greater than that of the first ceria layer.

20. The layered catalyst structure of claim 18, wherein, together, the first ceria layer and the second colloidal ceria layer constitute, by weight, greater than or equal to about 5% to less than or equal to about 40% of the layered catalyst structure, and wherein the palladium catalyst layer constitutes, by weight, greater than or equal to about 0.1% to less than or equal to about 5% of the layered catalyst structure.

* * * * *